J. S. McCURDY.
Sewing Machine.
No. 28,993.
Patented July 3, 1860.
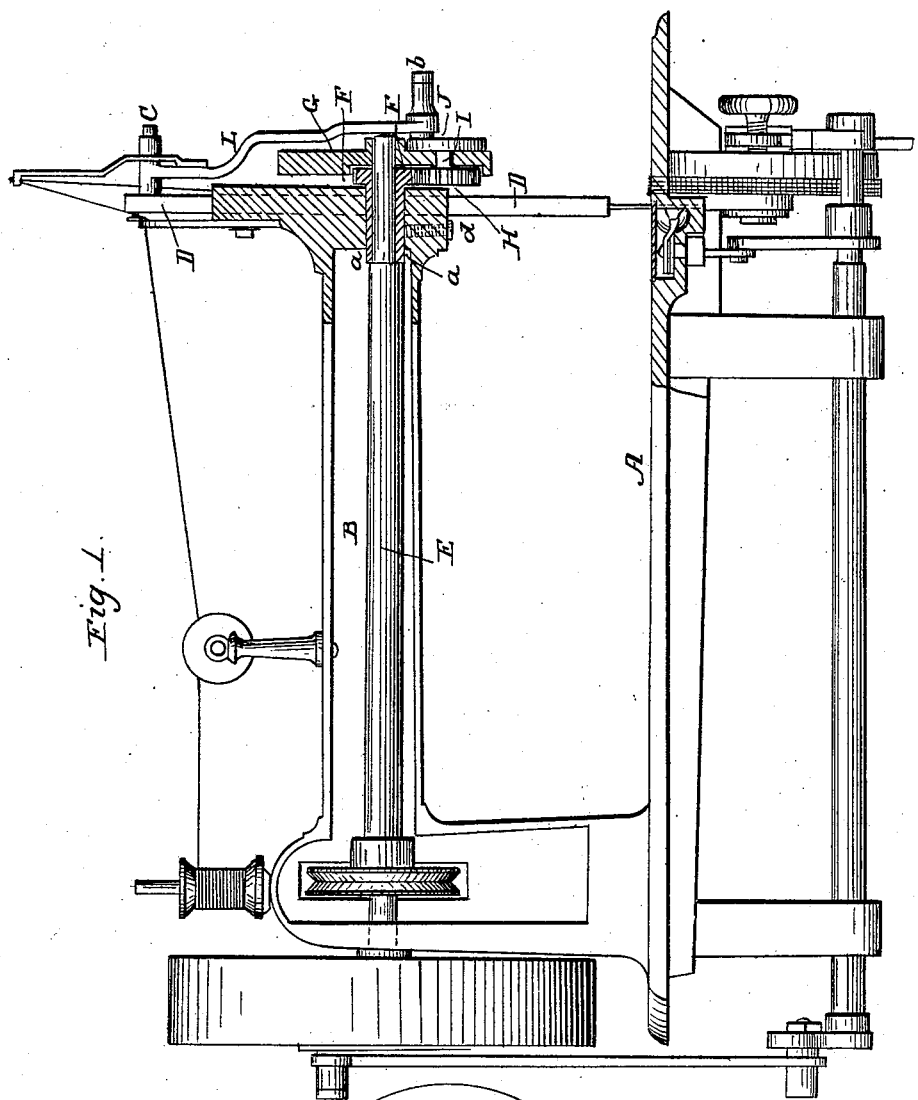
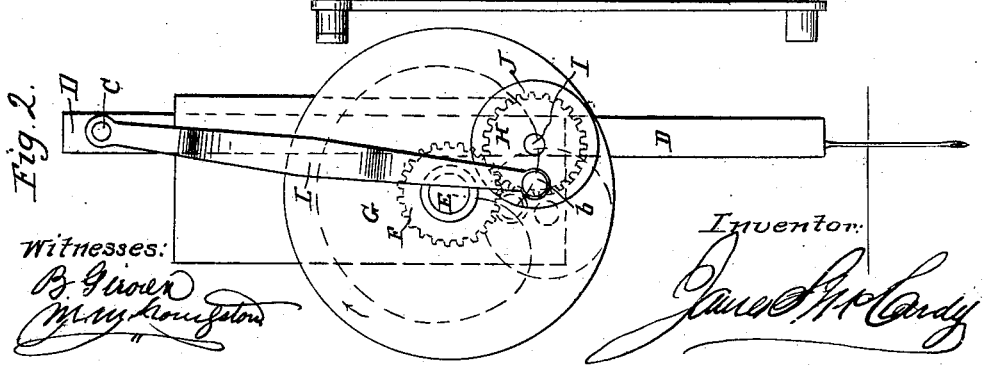

UNITED STATES PATENT OFFICE.

JAMES S. McCURDY, OF BROOKLYN, NEW YORK.

IMPROVEMENT IN SEWING-MACHINES.

Specification forming part of Letters Patent No. 28,993, dated July 3, 1860.

*To all whom it may concern:*

Be it known that I, JAMES S. MCCURDY, of Brooklyn, in the county of Kings and State of New York, have invented a new and useful Improvement in Sewing-Machines; and I do hereby declare that the following is a full, clear, and exact description of the same, reference being had to the accompanying drawings forming part of this specification, in which—

Figure 1 is a vertical section of a sewing-machine with my improvement. Fig. 2 is a side view of the needle-operating mechanism at right angles to Fig. 1 and on a larger scale than that figure.

Similar letters of reference indicate corresponding parts in both figures.

My invention consists in driving the needle of a sewing-machine by means of a pin, wrist, or its equivalent attached to a gear or wheel, which is caused to roll round a stationary gear, wheel, or circle of similar circumference, and so to give the said pin an epicycloidal movement, by which it is caused to give the needle a rapid motion during that part of its movement which takes place while it is out of the cloth or other material being sewed, but to produce the necessary retardation of its movement while in the material to allow time for the entrance of the shuttle or looper into the loop of the needle-thread and the passage of the shuttle through the loop.

To enable others skilled in the art to make and use my invention, I will proceed to describe its construction and operation.

A represents the bed of the sewing-machine.

B is the stationary arm, which contains the guide for the needle-bar D and the bearings for the horizontal main shaft E.

F is a stationary spur-gear, through which the shaft E passes, said gear being concentric with the said shaft, and being firmly secured in the stationary arm B by its having an elongated hub, $a$, fitted to a hole bored in the said arm and secured therein by a set-screw, $d$, which prevents its revolution with the shaft. The central bore of the said gear may constitute one of the bearings of the shaft, as is represented in Fig. 1.

G is a disk or wheel secured to the end of the shaft E, outside of and as near as convenient to the gear F.

H is a spur-gear of similar size and pitch to the stationary gear F, attached to a shaft, I, which is arranged parallel with the main shaft E in a bearing bored through the disk or wheel G, in such a position that the said gear H will gear with the stationary gear F and be caused to revolve upon its own axis by its revolution round the latter gear produced by the rotation of the main shaft and its disk or wheel G.

J is a small disk secured to the shaft I of the spur-gear H, on the opposite side of the disk or wheel G—that is to say, on the outer side, or side next the end of the main shaft E—and carrying the wrist-pin $b$, which is arranged at a distance from the center of the shaft I somewhat less than the radius of the pitch-circle of the gear H, and which, moving with the gear H, has an epicycloidal movement, as illustrated by the blue line in Fig. 2.

Instead of the disk J, a simple crank-arm may be used to carry the pin $b$.

L is a rod which connects the pin $b$ with the needle-bar D by a pin, $c$, secured in the needle-bar, and causes the needle-bar to derive a reciprocating motion from epicycloided motion of the pin $b$.

In placing the revolving gear H in gear with the stationary one, F, such regard should be had for the position of the pin $b$ that when the said pin arrives nearest to the axis of the main shaft E, which is the position indicated in red outline in Fig. 2, it will be almost directly below the said axis.

By reference to the epicycloidal line described by the axis of the pin $b$, (marked in Fig. 2 in blue color,) the character of the movement given to the needle-bar by the said pin will be well understood, such movement being what may be termed a "double reciprocating" movement—that is to say, consisting of a long and a very short upward and downward movement, the long downward movement carrying the needle into the cloth, and being followed by the short upward movement, which is sufficient to throw out the loop from the needle, and this being succeeded by a corresponding downward movement before the long upward movement to withdraw the needle from the cloth and draw up the loop. This needle motion is so arranged relatively to the shuttle motion that the shuttle enters the loop during the first part of the short downward movement. By arranging the pin $b$ nearer to or farther from the center of the shaft I the movement may be varied to make the short upward and downward movement less or greater, and by placing the said pin near enough to the said shaft the short upward and downward movement of the bar may be made so slight as to amount to scarcely more than a suspension of its movement between the longer downward and upward movement.

I do not claim giving the needle-bar a double reciprocating movement, as I am aware that has been done by means of a rocker; but

What I claim as my invention, and desire to secure by Letters Patent, is—

Driving the needle of a sewing-machine by means of a wrist, pin, or its equivalent attached to a gear or wheel, which is caused to roll round a stationary gear, wheel, or circle of a similar diameter, and so to give the said wrist, pin, or equivalent an epicycloidal movement, substantially as herein described.

JAMES S. McCURDY.

Witnesses:
B. GIROUX,
M. M. LIVINGSTON.